(12) United States Patent
Chang (10) Patent No.: US 7,140,820 B2
(45) Date of Patent: Nov. 28, 2006

(54) TRUCK TRAILER FOR VEHICLE TRANSPORTATION

(76) Inventor: Chun-Yi Chang, PO Box 82-144, Taipei (TW)

( * ) Notice: Subject to any disclaimer, the term of this patent is extended or adjusted under 35 U.S.C. 154(b) by 0 days.

(21) Appl. No.: 10/968,097

(22) Filed: Oct. 20, 2004

(65) Prior Publication Data

US 2006/0083597 A1   Apr. 20, 2006

(51) Int. Cl.
*B60P 7/08* (2006.01)

(52) U.S. Cl. .................. 410/24.1; 410/26; 410/27; 410/28; 410/28.1; 410/29.1

(58) Field of Classification Search ............... 410/24, 410/26–28, 24.1, 28.1, 29.1
See application file for complete search history.

(56) References Cited

U.S. PATENT DOCUMENTS

| 2,694,597 | A | * | 11/1954 | Kunz | 410/24.1 |
| 2,993,725 | A | * | 7/1961 | Van Keuren | 410/24.1 |
| 3,084,970 | A | * | 4/1963 | Day | 410/29.1 |

* cited by examiner

Primary Examiner—Stephen Gordon
(74) Attorney, Agent, or Firm—Egbert Law Offices (57) ABSTRACT

A truck-trailer for easy changeability and wider range of applicability in simplified construction to increase transportation capacity and improve changeability and applicability having the front and the rear sections of the main deck each pivoted with a retractable slope; the rear end of the main deck being disposed of a multi-sectional access slope for the access by different types of vehicles; and an elevation deck set being provided on the main deck to cope with the load of various types of vehicles to increase loading capacity.

8 Claims, 9 Drawing Sheets

TRUCK TRAILER FOR VEHICLE TRANSPORTATION

BACKGROUND OF THE INVENTION (a) Technical Field of the Invention

The present invention is related to a truck trailer, and more particularly to one for vehicle transportation in simplified construction for reduction of production cost allowing fast and diversified changeability depending on the load to increase its applicability and load volume.

(b) Description of the Prior Art

To transport semi-products of vehicles or vehicles pending issuance of license plate that are prevented from driving on the highway, a truck trailer for the transportation of those vehicles has been developed. To cope with the various types and sizes of vehicles, dedicated truck trailers are made available. However, those dedicated truck trailers fail to meet the needs of the transportation companies since the dispatch of a dedicated truck trailer just for the transportation of few vehicles would cost too much costs. Therefore, the transportation companies are always seeking for the type of truck trailer that can handle different types of vehicles and in larger transportation capacity for a single run.

In order to improve changeability and capacity, the construction of the truck trailer has become more complicated, and caused operating difficulties to result in higher production cost and the problem of insufficient strength that significantly affect the safety of the truck trailer.

The prior art as described above is generally found with the defectives of poor interchangeability, low applicability, difficult operation, higher production cost and low safety.

SUMMARY OF THE INVENTION

The primary purpose of the present invention is to provide an improved structure of a truck trailer that offers convenient changeability to facilitate the operation by the user.

Another purpose of the present invention is to provide an improved structure of a truck trailer that offers wider range of applicability to handle vehicles of different types.

Yet another purpose of the present invention is to provide an improved structure of a truck trailer that is simplified in construction to lower the production cost of the truck trailer.

Yet another purpose of the present invention is to provide an improved structure of a truck trailer that upgrades the structural strength and permits good positioning to better assure of driving safety.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
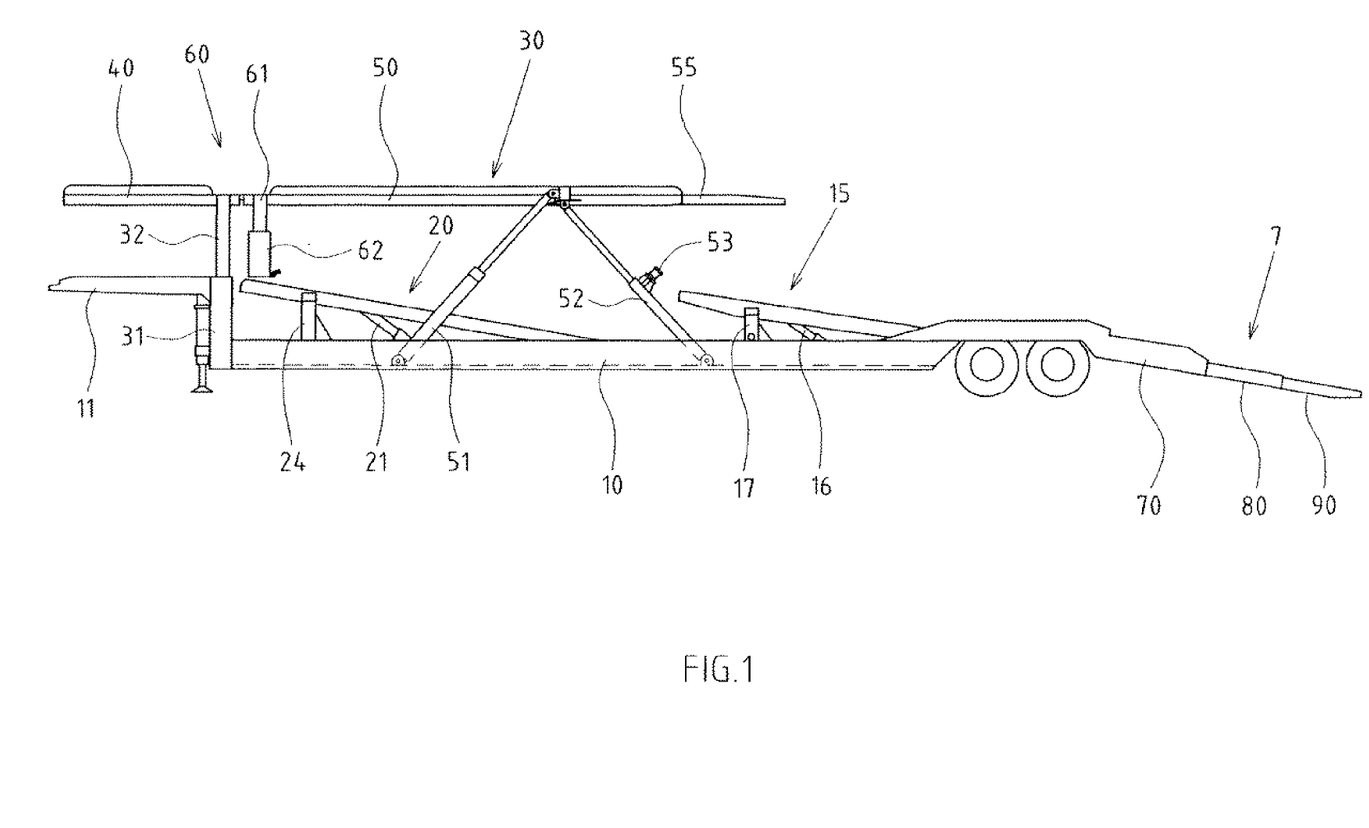
FIG. 1 is a schematic view showing a layout of the present invention.

The present invention is related to a truck trailer allowing easy changeability and wide range of applicability. Referring to FIG. 1, the trailer is essentially comprised of a main deck 10, a first and a second slope 15, 20 with both retractable, an elevation deck set 30 provided over the main deck 10, and an access slope set 7 related to a lane comprised of a front section 70, a middle section 80 and a rear section 90 is provided to the rear end of the main deck.

Figure 2:
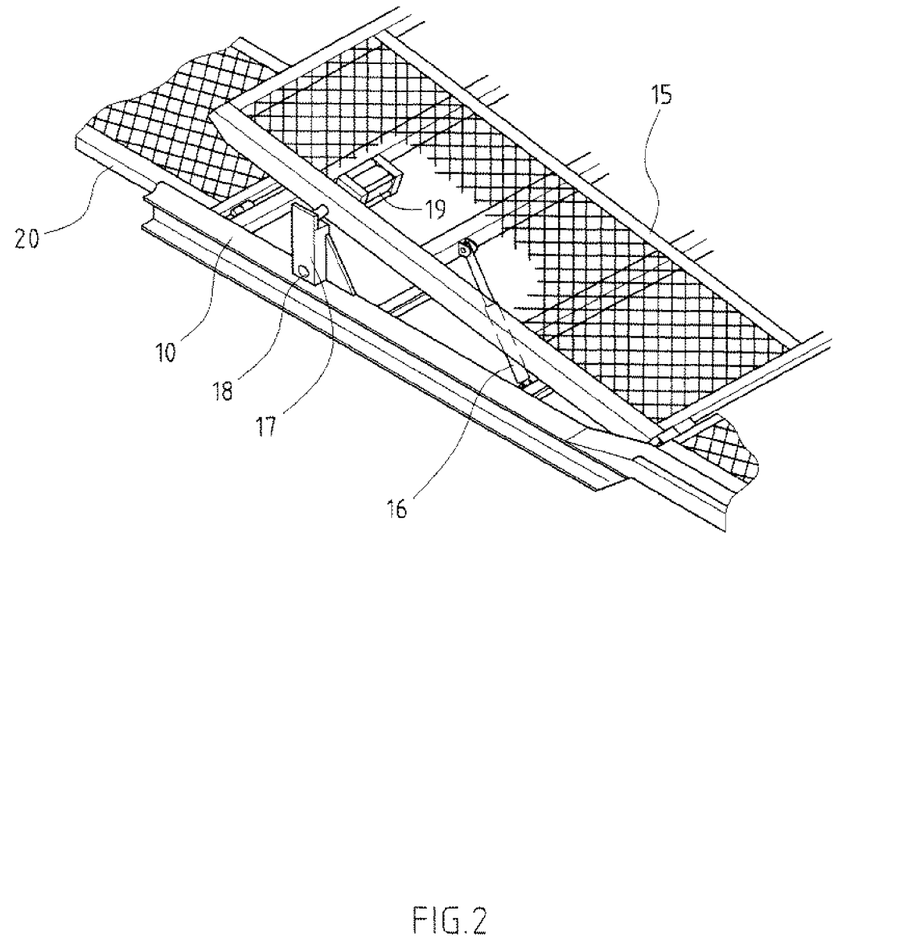
FIG. 2 is a perspective view showing a first slope and a main deck of the present invention.
Figure 3:
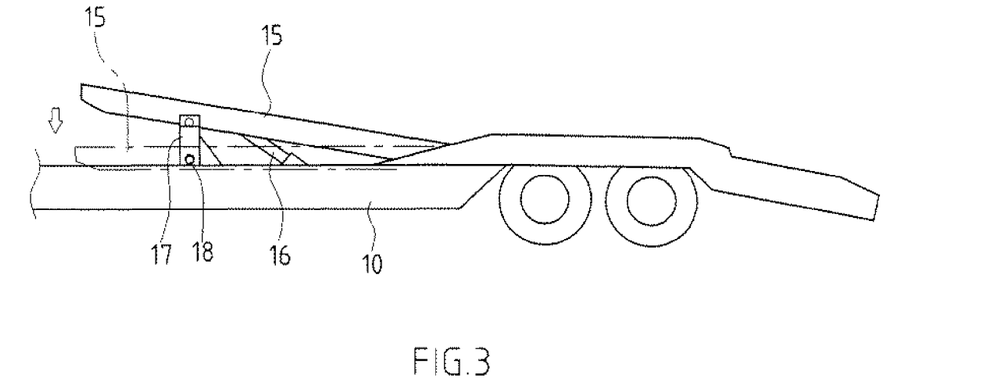
FIG. 3 is a schematic view showing a layout of the movement of the first slope of the present invention.
Figure 3A:
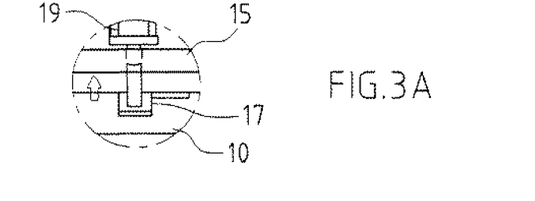
FIG. 3A is an enlarged portion showing a layout of the movement of the first slope of the present invention.

Also referring to FIG. 2, the main deck 10 for lowering its central gravity indicates concave in relation to front and rear wheels of the trailer. A front deck 11 extends laterally from the front end of the main deck 10 to provide more loading area for the main deck 10. The rear end of the first slope is pivoted to the front end of the main deck at where in relation to the rear wheels. The front end of the first slope is connected to the main deck 10 with a lifting cylinder to operate the first slope 15 to extend at an inclination or retract horizontally in relation to the main deck 10 as illustrated in FIG. 3. A plunging stud 17 is disposed on the side edge of the front end of the first slope 15, an insertion hole 18 for positioning is disposed at the lower end of the plunging stud 17. A retractable rod set 19 is disposed at the front end of the first slope 15 to merely when stretched out uphold the top of the plunging stud 17 or stick into the insertion hole 18.

Accordingly, when the first slope 15 extends or retracts, it is upheld and secured in position to improve its bearing capacity.

Figures 4, 4A:
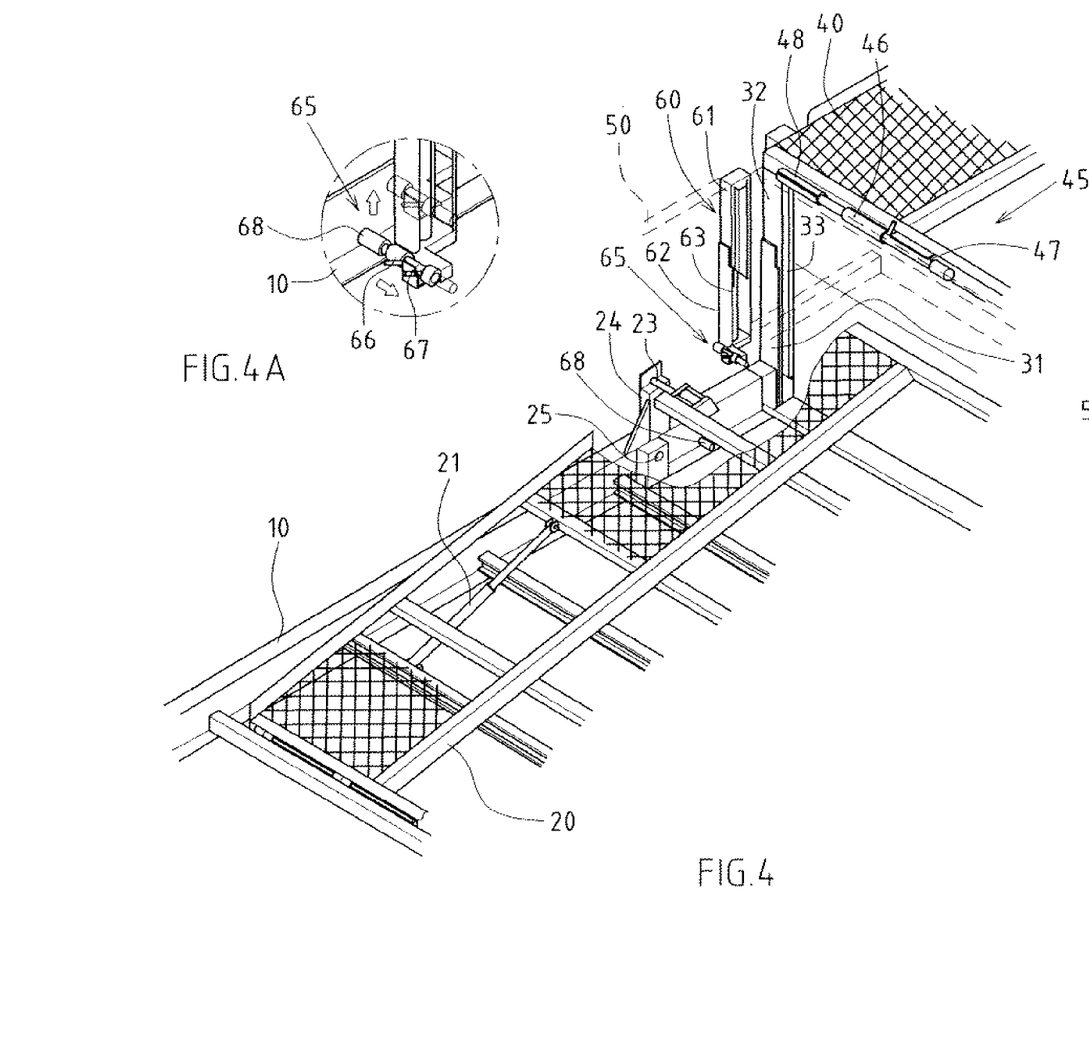
FIG. 4 is a perspective view showing a second slope and an elevation slope of the present invention.
FIGS. 4A and 4B are enlarged portions showing a second slope and an elevation slope of the present invention.
Figure 4B:
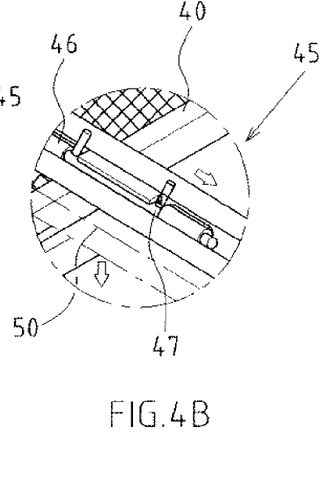
Figures 5, 5A:
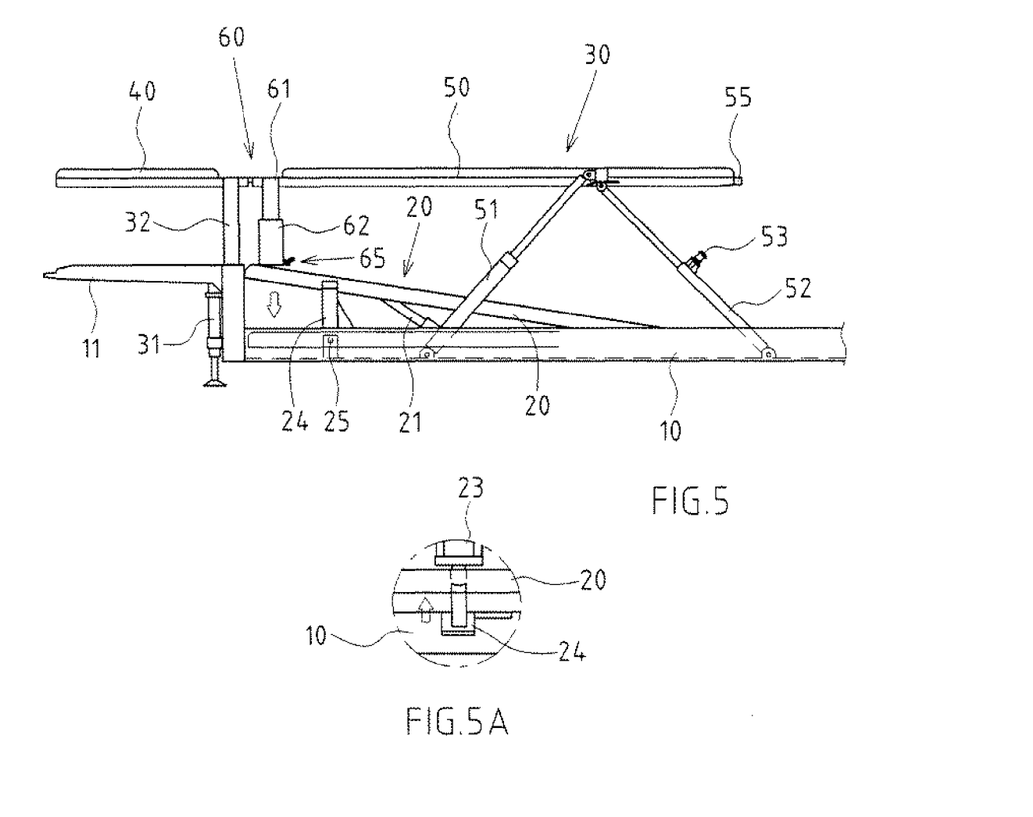
FIG. 5 is a schematic view showing a layout of the movement of the second slope of the present invention.
FIG. 5A is an enlarged portion showing a layout of the movement of the second slope of the present invention.

As illustrated in FIGS. 4, 4A and 4B, the second slope 20 has its rear end pivoted to the middle section of the main deck 10. Another lifting cylinder 21 is used to connect the front end of the second slope 20 to the main deck 10 to operate the second slope 20 to extend at an inclination or retreat horizontally in relation to the main deck 10 as illustrated in FIG. 5 and FIG. 5B. Once the second slope 20 is upheld to its paramount, its top edge is coupled to the front deck 11 to facilitate the vehicles for the transportation to access to the front deck 11. An extension rod set 23 is disposed at the front end of the second slope 20 while a plunging stud 24 is provided at the side edge of the extension rod of the second slope 20 and an insertion hole 25 for positioning is provided at the lower end of the plunging stud 24. Accordingly, when the extension rod set 23 of the second slope 20 is stretched out, it merely upholds against the top of the plunging stud 24 or sticks into the insertion hole 25 for the second slope 20 when extending or retreating to uphold or secure in position to improve its bearing capacity.

Figure 6:
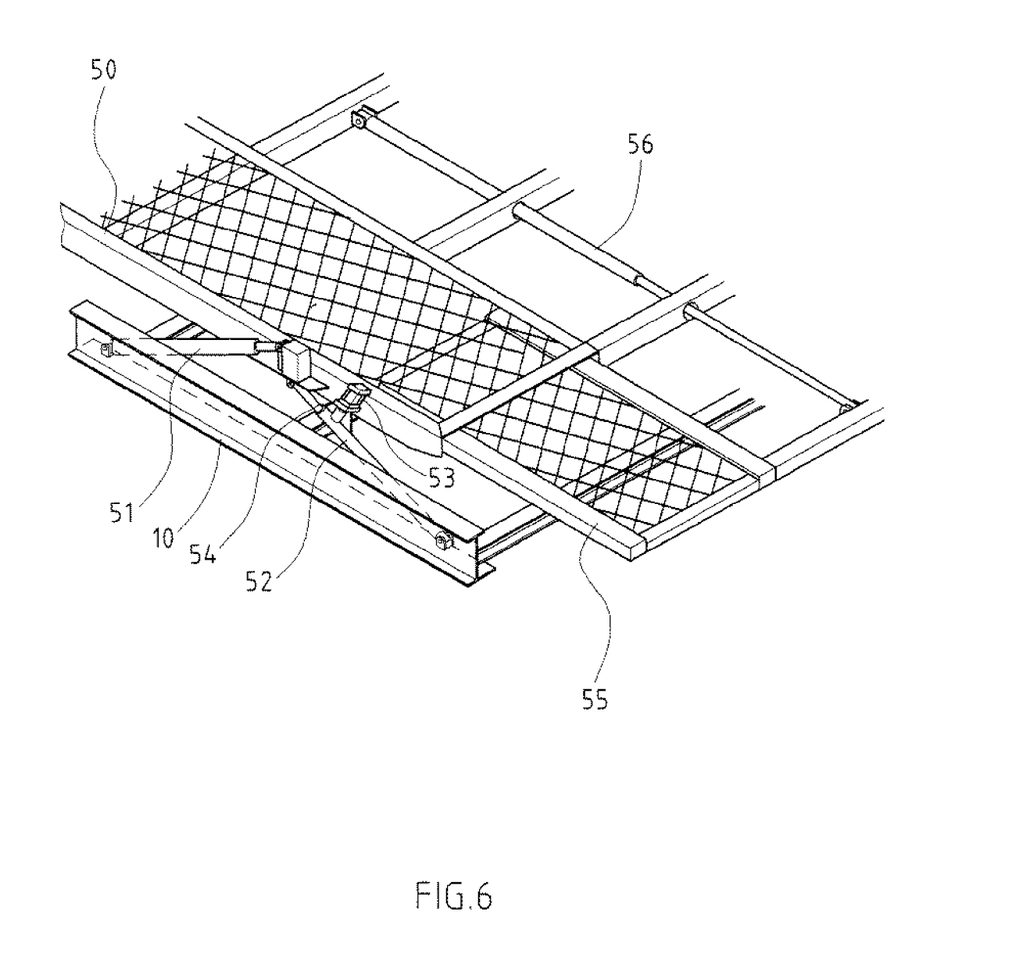
FIG. 6 is a perspective view of the elevation deck set of the present invention.
Figure 7:
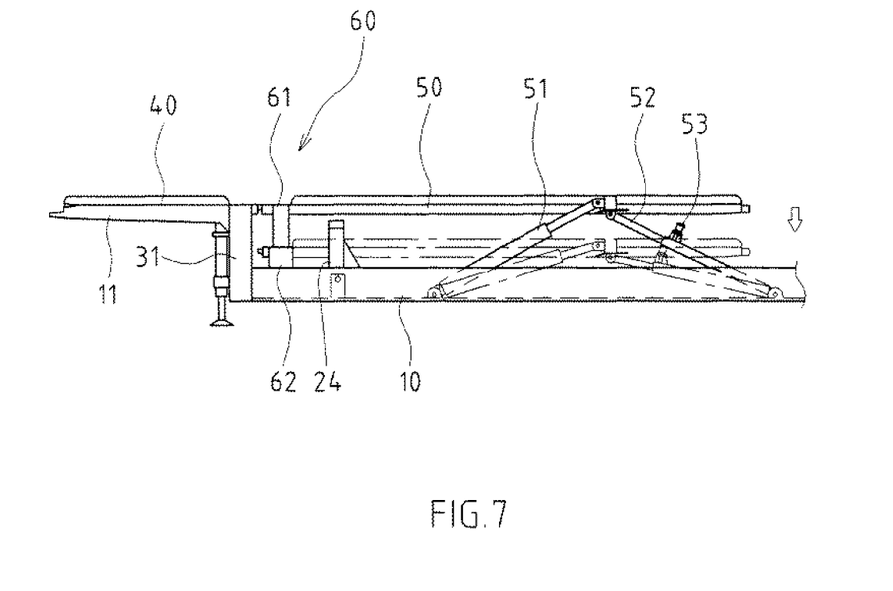
FIGS. 7 and 7A are schematic views showing a layout of the movement of the elevation deck set of the present invention.
Figure 7A:
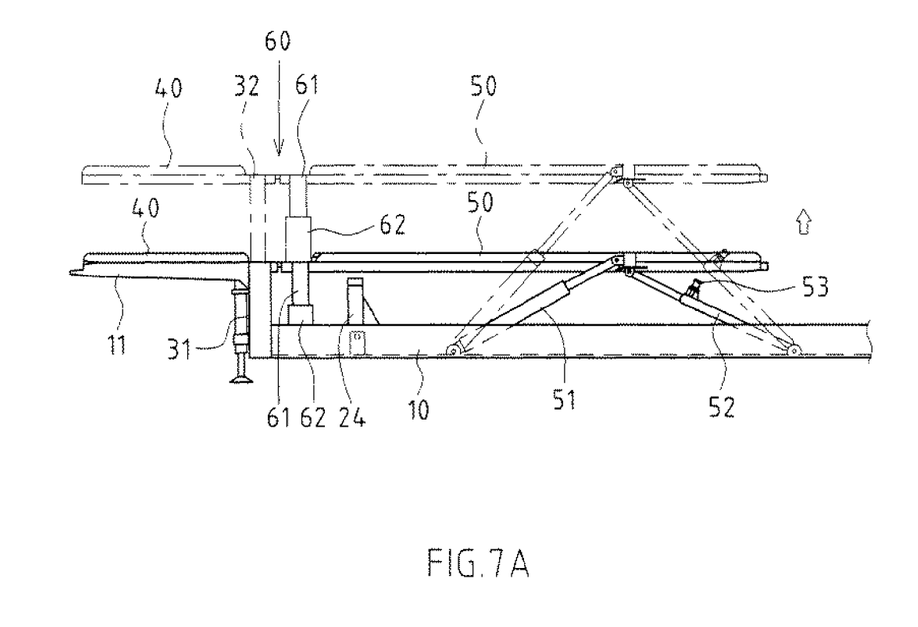

Now referring to FIGS. 4, 5, and 6, the elevation deck set 30 provided over the main deck 10 is adapted each on both side edges of the front section of the main deck 10 at where close to the front deck 11 with a first rod 31 extending upwardly. The first rod 31 containing a telescopic rod 32 that slides up and down using a telescopic cylinder 33. An upper front deck 40 extending forwardly is disposed between both tops of those two telescopic rods 32 and may be stacked inside the front deck 11 of the main deck as illustrated in FIG. 7A. Furthermore, a bolting set 45 disposed at the rear end of the upper front deck 40 is used to lock up an upper deck 50 extending backwardly. The bolting set 45 has provided on both sides of the rear end of the upper front deck 40 each a bolting sleeve 46 adapted with an bolt 47,which slides laterally for positioning in relation to the bolting sleeve 46. A corresponding insertion sleeve 48 is provided at the front edge of the upper deck 50 to receiver insertion of the bolt 47 to couple the upper front deck 40 and the upper deck.

A first lifting cylinder 51 and a second lifting cylinder 52 are pivoted to the middle section of the upper deck 50. Another ends respectively of the first and the second lifting cylinders 51, 52 are pivoted to the front and the rear sections of the main deck 10 for the upper deck 50 to elevate by the extension and retraction of both of the first and the second lifting cylinders as illustrated in FIGS. 7 and 7A. To position the upper deck 50 and to increase its bearing capacity for improved operation safety, a telescopic cylinder set 53 for positioning is provided to the outer tube, of the second lifting cylinder 52 and a series of corresponding insertion holes 54 for positioning are disposed on the inner tube of the second lifting cylinder 52. An extension deck 55 capable of engaging internal and external slide is provided in the rear end of the upper deck 50, and an active lifting cylinder 56 is provided between the extension deck 55 and the upper deck 50. On both sides of the upper deck 50 at where closer to the first rod 31, a mobile stud set 60 extending downwardly is each provided and fixed to an extension rod 61 on both sides of the upper deck 50. The extension rod 61 is inserted with a second rod 62 and a lifting cylinder 63 to operate both of the extension rod 61 and the second rod 62 is disposed between the extension rod 61 and the second rod 62. A lockset 65 to lock up the main deck 10 is provided at the lower end of the second rod 62, and the lock set 65 is adapted with a bolting sleeve 66 provided with an insertion bolt 67 at the lower end of the second rod 62. The insertion bolt 67 laterally slides for positioning purpose in relation to the bolting sleeve 66. Another bolting sleeve 68 in relation to the bolting sleeve 66 is provided on the main deck for the user to operate the insertion bolt 67 for the control of the engagement or disengagement of the second rod 62 to or from the main deck 10.

Figure 8:
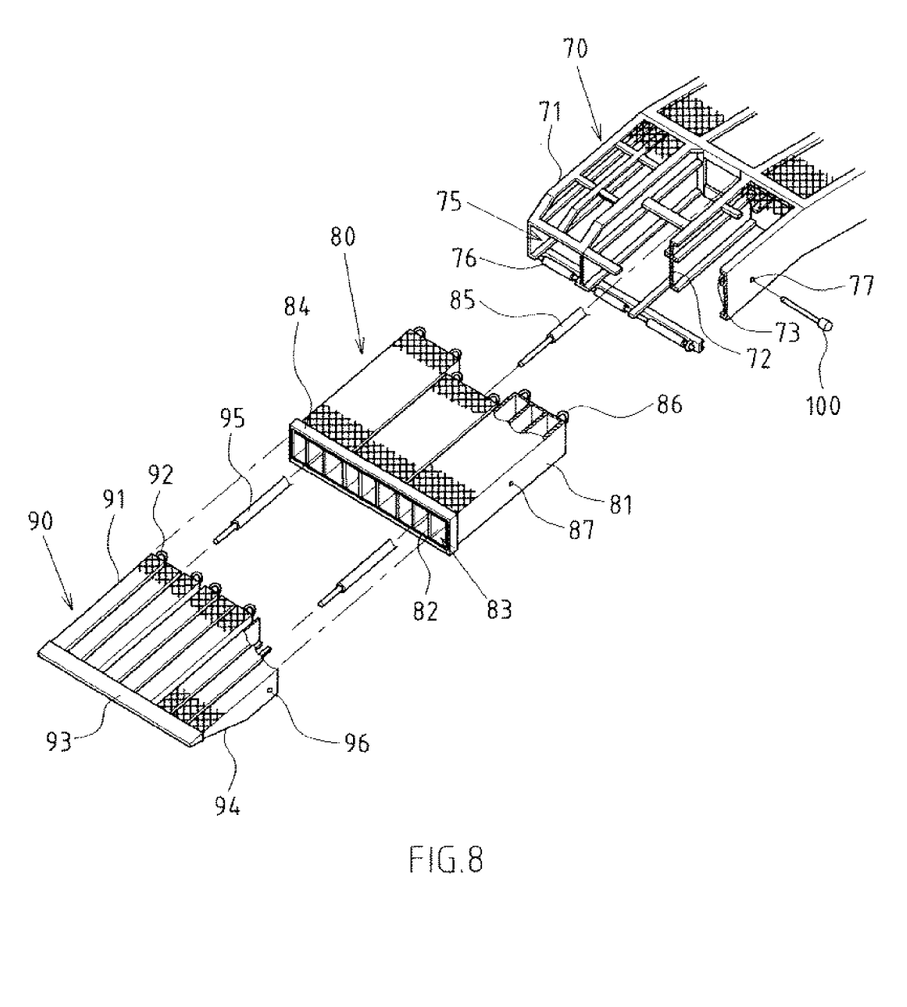
FIG. 8 is an exploded view of an access slope of the present invention.
Figure 9:
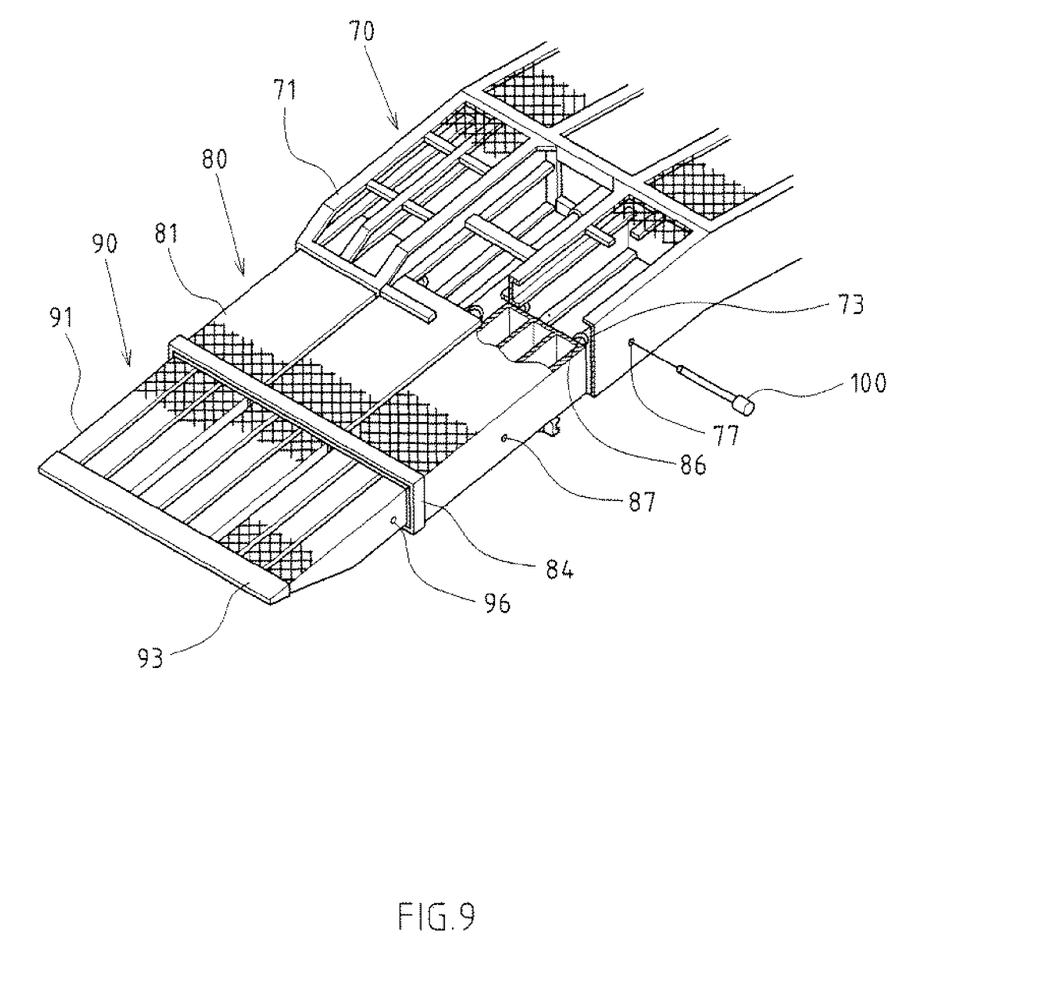
FIG. 9 is a perspective view of the access slope of the present invention.

As illustrated in FIGS. 8 and 9, the access slope set 7 relates to a whole-piece of a lane comprised of front, middle, and rear sections 70, 80, and 90 that can be relative extended and retreated. The front section 70 is comprised of a lip-rounding steel frame 71 provided with multiple partitioning plates 72 arranged at equal spacing to define three open ways 75 to be engaged to the middle section 80. A guide plate 73 is each provided to the lip-rounding steel frame 71 and each partitioning plate 72, and a rolling rod 76 is provided to the bottom edge of the outlet of each open way 75 of the lip-rounding frame 71 to permit smooth slide by the middle section 80 of the lane. The front section 70 has a limiting insertion hole 77 provided on one side of the lip-rounding steel frame 71 for securing both of the middle section 80 and the rear section 90 of the lane in position when retreated.

The middle section of the lane 80 is comprised of three pieces of lip-rounding steel 81 in relation to those three open ways 75 from the front section 70. All three pieces of lip-rounding steel 81 are kept at a proper spacing among one another for easy slide into their respective open ways 75 from the front section 70 of the lane. Two partitioning plates 82 at equal spacing are provided inside each piece of lip-rounding steel 81 and one open way 83 is provided to each piece of lip-rounding steel 81 for the rear section 90 of the lane to slide in. A square frame 84 is used to confine the front ends of three pieces of lip-rounding steel 81 to improve their strength. A first lifting cylinder 85 is provided between the middle section 80 and the front section 70 of the lane to operate the extension or retraction of the middle section 80 against the front section 70 of the lane. Multiple casters 86 in relation to the bottom edges of the guides in the lip-rounding steel frame 71 of the front section 70 of the lane are provided to the rear end of each of those three pieces of lip-rounding steel of the middle section 80 to improve the smooth engagement of both of the middle and the front sections 80, 70 of the lane. An insertion hole 87 is provided on the farthest side of the middle section 80 to facilitate securing the middle section 80 to the front section 70.

Figure 10:
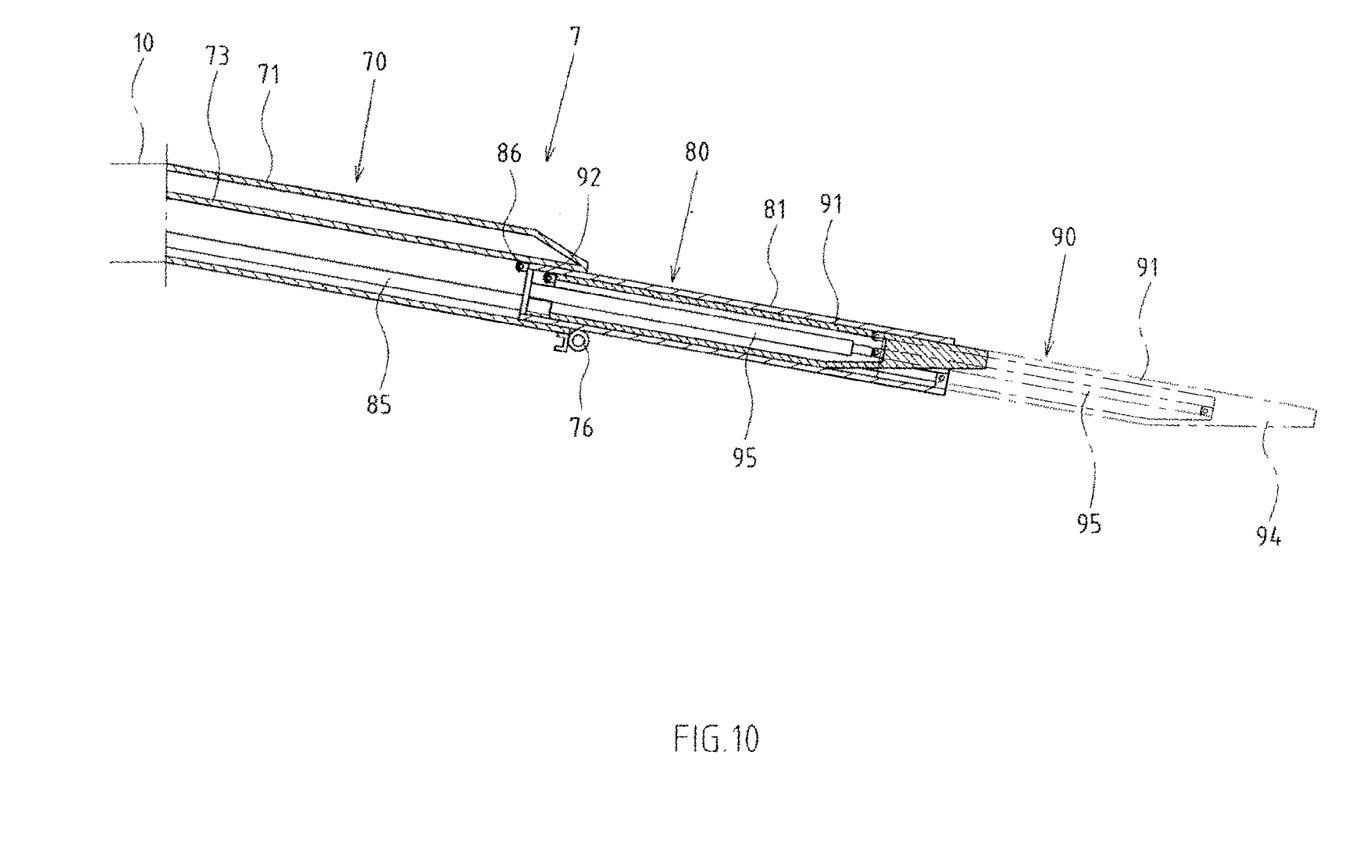
FIG. 10 is a layout of the movement of the access slope of the present invention.

The rear section 90 of the lane is comprised of nine pieces of lip-rounding steel 91 in relation to those open ways 83 from each piece of lip-rounding steel of the middle section 80 of the lane. All nine pieces of lip-rounding steel 91 are kept at proper spacing to facilitate engagement into those open ways 83 from the middle section 80 of the lane. A caster 92 is provided to the top edge of the terminal of each piece of the lip-rounding steel 91 to help achieve smooth slide into those open ways 83 from the middle section 80. A fixation steel plate 93 is used to lock up the front ends of all nine pieces of the lip-rounding steel 91 to improve their strength. The lower surface of the tip of the fixation steel plate 93 is provided with a ramp 94 flushed against the ground as illustrated in FIG. 10 to increase the stability of the rear section 90 of the lane. A second lifting cylinder 95 is provided between the rear and the middle sections 90, 80 of the lane to operate the contraction and extension of the rear section 90 against the middle section 80 of the lane. A limiting insertion hole 96 is provided on the farthest side of the rear section 90 to be inserted with a limiting insertion pin 100 when aligned with the limiting insertion holes 87, 77 respectively from the middle and the front sections 80, 70 of the lane as illustrated in FIG. 9.

In practice as illustrated in FIGS. 1, 9, and 10, the limiting insertion pin 100 in the access slope set 7 is first removed, and both of the first lifting cylinder 85 from the middle section 80 of the lane and the second lifting cylinder 95 from the rear section 90 of the lane are operated to allow both of the middle and the rear sections 80, 90 of the lane to extend while having the ramp 94 of the rear section 90 of the lane flushed against the ground to significant increase its stability. Whereas all the front section 70, the middle section 80, and the rear section 90 are connected by engaging those pieces of lip-rounding steel, they provide excellent structural strength and facilitate the access of the vehicles to the trailer.

In case of any vehicle in extra long body is loaded on the main deck 10, the chassis may be stuck when the front wheels have entered on the main deck 10 and the rear wheels of the vehicle have not yet climbed on the access slope set 7. To avoid this problem, the first slope 15 will be lifted at a certain inclination as illustrated in FIGS. 2 and 3 to let down the first slope 15 only until the rear wheels have climbed on the access slope set 7. The first slope 15 may be also lifted up in the event that the vehicle in transition has to enter on the upper deck 50 of the elevation deck set 30. When the first slope 15 is lifted at a certain inclination, the extension rod set 19 upholds the top of the plunging stud to improve the bearing capacity of the first slope 15.

The changeability of the second slope 20 can be done to compromise the type of the vehicle to be loaded on the deck. For example, upon loading a small car, the second slope 20 is lifted up to permit the car to enter onto the front deck 11. Alternatively, in case of loading a large car or the elevation deck set 30 must be lowered, the second slope 20 is lowered and retreated onto the main deck 10. As illustrated in FIGS. 4 and 5, the lifting cylinder 21 operates the second slope 20 to rise at an inclination for allowing the front edge of the second slope 20 aligned to the rear edge of the front deck 11 to permit the car to access to the front deck 11 while the extension rod unit 23 upholds the top of the plunging stud 24 as the second slope 20 is rising at a certain inclination so to improve the bearing capacity of the second slope 20. When the second slope 20 must be lowered, the extension rod set 23 is retreated and the lifting cylinder 21 is also retreated to allow the second slope 20 stack up on the main deck 10. The extension rod set 23 is then extending once again and inserted into the insertion hole 25 for positioning to give the better positioning results for the second slope 20.

Furthermore, as illustrated in FIGS. 4, 6, and 7 when the service of the elevation deck set 30 is required, the positioning telescopic cylinder set 53 of the second lifting cylinder 52 is retracted to free the second lifting cylinder. The extension rod 32 of the first rod 31 and the first and the second lifting cylinders 51, 52 are synchronously retracted to descend the upper deck 50 and the upper front deck 40 on the elevation deck set 30 thus for the rear end edge of the upper deck 40 aligned to the first slope 15 rising at a certain inclination to facilitate the access of the car to the elevation deck set 30. Upon completing the access, the extension rod 32 and the first and the second lifting cylinders 51, 52 uphold synchronously while allowing the positioning telescopic cylinder set 53 on the second lifting cylinder 32 to once against constrict the slide of the second lifting cylinder 52 for facilitating the access of the car to the main deck 10 on the lower deck, thus to improve its bearing capacity. In case of a car with a longer body or as required, the lifting cylinder 56 in the upper deck 50 is operated to extend the extension deck 55 at the rear of the upper deck 50 to permit more loading space and to increase the changeability of the upper deck 50.

If a car of extra height is directly loaded on the lifted elevation deck set 30, it may violate against the height limit on the general highway, and the car is prevented from being placed at where between the main deck 10 and the upper deck 50; simply lower the upper front deck 40 and the upper deck 50 of the elevation deck set 30 until the upper front deck 40 is completely stacked upon the front deck 11 of the main deck 10, and have the insertion bolt 67 at the lower end of the second stud 62 of the mobile stud set 60 to be placed into the insertion sleeve 68 of the main deck. Accordingly, the mobile stud set 60 is coupled to the main deck 10. The insertion bolt 47 of the bolting set 45 located between the upper deck 50 and the upper front deck 40 is pulled away from the insertion sleeve 48 to disengage the upper deck 50 from the upper front deck 40. Meanwhile, the extension rod 61 of the mobile stud set 60, and both of the first and the second lifting cylinders 51, 52 remain retreated to stack the upper deck 50 upon the top of the main deck for making possible for the trailer to take up excessively high vehicle to significantly improve the applicability of the present invention.

On the contrary, to return to the original status, operate the extension rod 61 of the mobile stud set 60 and both of the first and the second lifting cylinders 51, 52 in opposite direction to lift the upper deck 50 up to where in align with the upper front deck 40 to lock up the bolting set 45 and separate the bolting set 65 of the mobile stud set 60 from the main deck 10, thus to rise synchronously the upper front deck 40 and the upper deck 50 of the elevation deck set 30 using both of the first and the second lifting cylinders 51, 42 and the extension rod 32 of the first rod 31.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An apparatus comprising:
   a truck trailer having front wheels and rear wheels and a main deck having a front section and a rear section;
   a first slope positioned adjacent said rear section of said main deck;
   a second slope positioned adjacent said front section of said main deck, each of said first and second slopes being retractable between a first position received generally horizontally in said main deck and a second position inclined at an acute angle with respect to said main deck;
   an elevation deck set positioned above said main deck, said main deck positioned above said front wheels and rear wheels;
   a lower front deck laterally extending from a front end of said main deck, said first slope having a rear end pivotally connected to said main deck adjacent said rear wheels;
   a first lifting cylinder connecting a front end of said first slope to said main deck so as to move said first slope between said first position and said second position, said second slope having a rear end pivotally connected to a middle of said main deck;

a second lifting cylinder connecting a front end of said second slope to said main deck so as to move said second slope between said first position and said second position, said elevation deck set having an upper deck and an extension deck;

a pair of first rods extending upwardly respectively from opposite sides of said front end of said main deck adjacent said lower front deck, each of said pair of first rods having an extension rod that is slidable upwardly and downwardly;

an upper front deck positioned on top of the extension rods, said upper front deck engageable with an upper deck of said elevation deck set by a bolt set;

a first lift cylinder having one end pivotally connected to a middle of said upper deck of said elevation deck set and an opposite end pivotally connected to said front section of said main deck;

a second lift cylinder having one end pivotally connected to said middle of said upper deck of said elevation deck set and an opposite end pivotally connected to a said rear section of said main deck;

a mobile stud set disposed on sides of said upper deck of said elevation deck set adjacent said pair of first rods, the extension rods of said pair of first rods being fixed to said mobile stud set;

a pair of second rods each having an extension rod connected to respective opposite sides of said upper deck of said elevation deck set;

a lock set affixed to a lower end of said pair of second rods suitable for engaging with said main deck; and an access slope positioned at an end of said rear section of said main deck, said access slope having an access slope front section and a middle section and an access slope rear section, said access slope front section and said middle section and said access slope rear section being extendable in relationship to each other, said access slope front section and said middle section and said access slope rear section defining a driveway, said access slope front section having a steel frame containing partitioning plates arranged with equal spacing and three open ways opening at an end surface of said steel frame, said steel frame of said access slope front section having a guide plate on an inner side of the partitioning plates, said middle section having three steel sections arranged respectively in alignment with said three open ways of said access slope front section, said three steel sections having a spacing therebetween suitable for allowing said three steel sections to be slidable into respective open ways of said access slope front section, said middle section having nine open ways defined at an end opposite said access slope front section, a first telescopic cylinder being arranged between said middle section and said access slope front section, said access slope rear section having nine steel sections aligned respectively with said nine open ways of said middle section, said nine steel sections having a spacing therebetween so as to be slidable into the respective nine open ways of said middle section, a second telescopic cylinder being arranged between said access slope rear section and said middle section.

2. The apparatus of claim 1, further comprising:
a plunging stud affixed on a side of said main deck adjacent a side of said first slope;
a positioning insertion hole disposed at a lower end of said plunging stud;
an extension rod set positioned on a top of said first slope so as to selectively support said first slope upon said plunging stud.

3. The apparatus of claim 1, further comprising:
an extension rod set positioned at a front end of said second slope;
a plunging stud positioned on said main deck adjacent a front end of said second slope; and
a positioning insertion hole disposed at a lower end of said plunging stud, said extension rod set selectively supporting said second slope on said plunging stud.

4. The apparatus of claim 1, further comprising:
a rolling rod positioned at a bottom of said driveway.

5. The apparatus of claim 1, further comprising:
a constrictive frame positioned at a front end of said middle section.

6. The apparatus of claim 1, further comprising:
a caster disposed at a top edge at an end of one of said middle section and said access slope rear section.

7. The apparatus of claim 1, further comprising:
a ramp formed on a bottom of a front end of said access slope.

8. The apparatus of claim 1, further comprising:
an insertion hole formed in each of said middle section and said rear section of said access slope; and
a limiting insertion pin engageable with the insertion hole so as to fix a position of one of said middle section and said rear access slope section.

* * * * *